Figure 6:
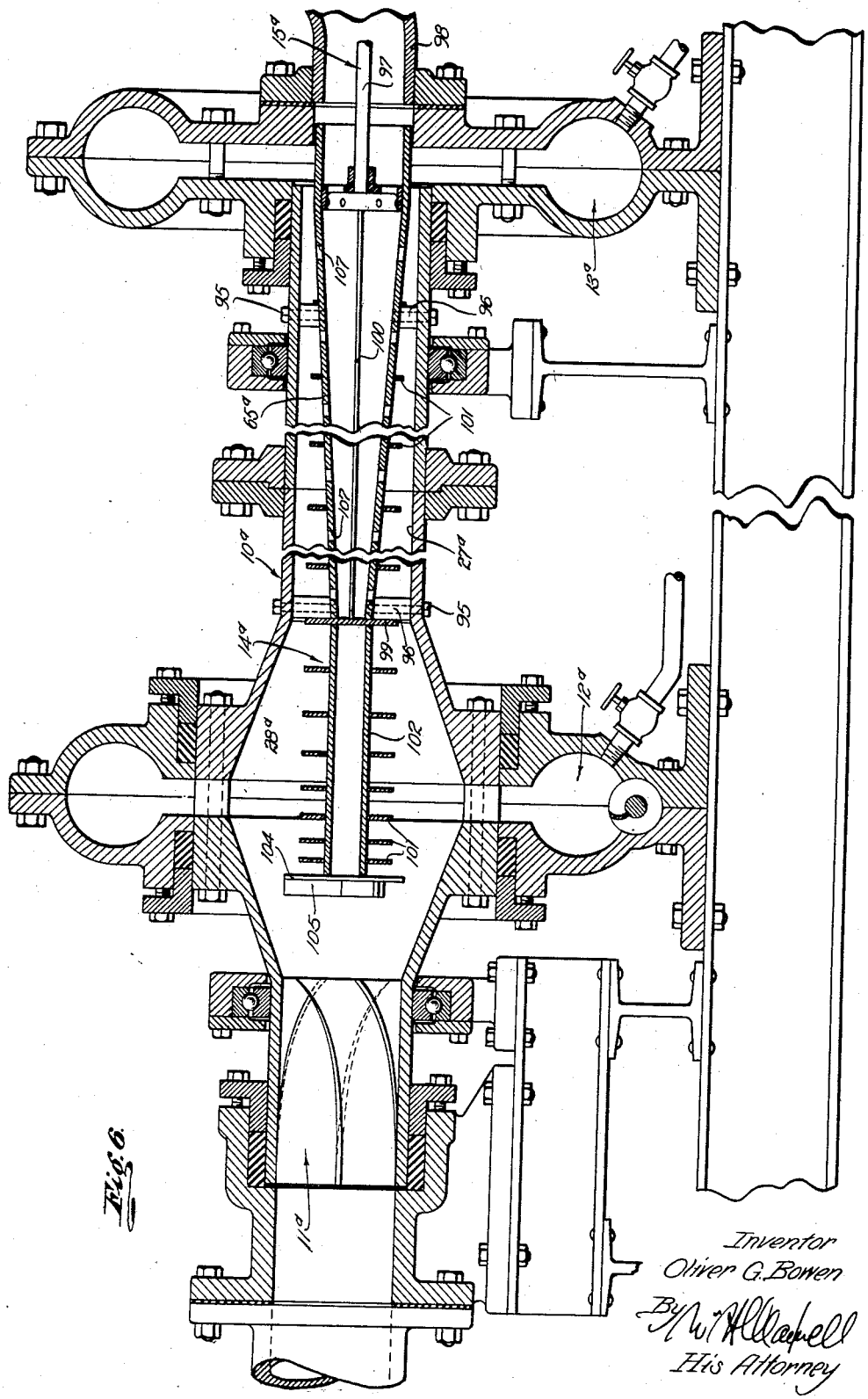

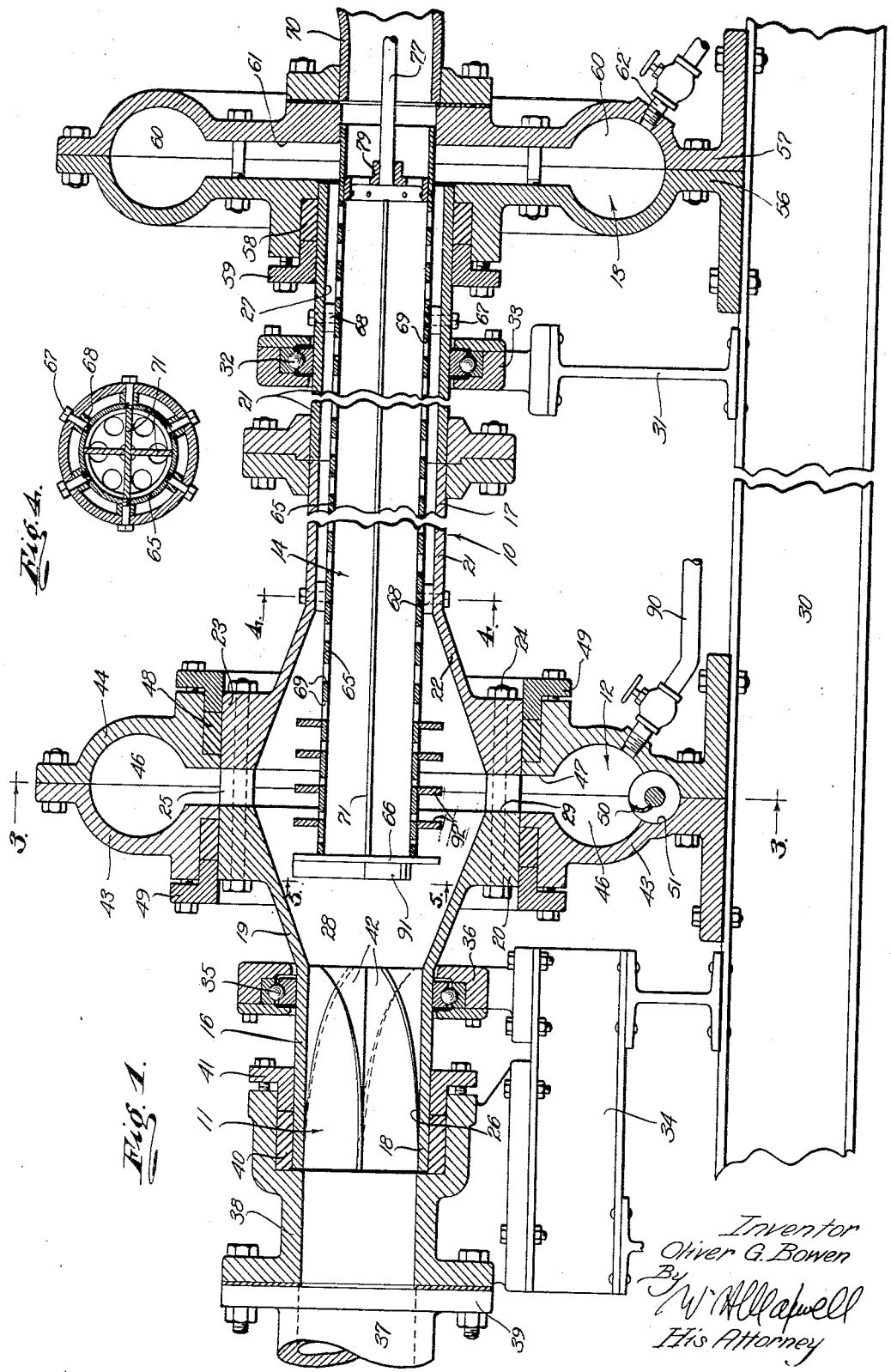

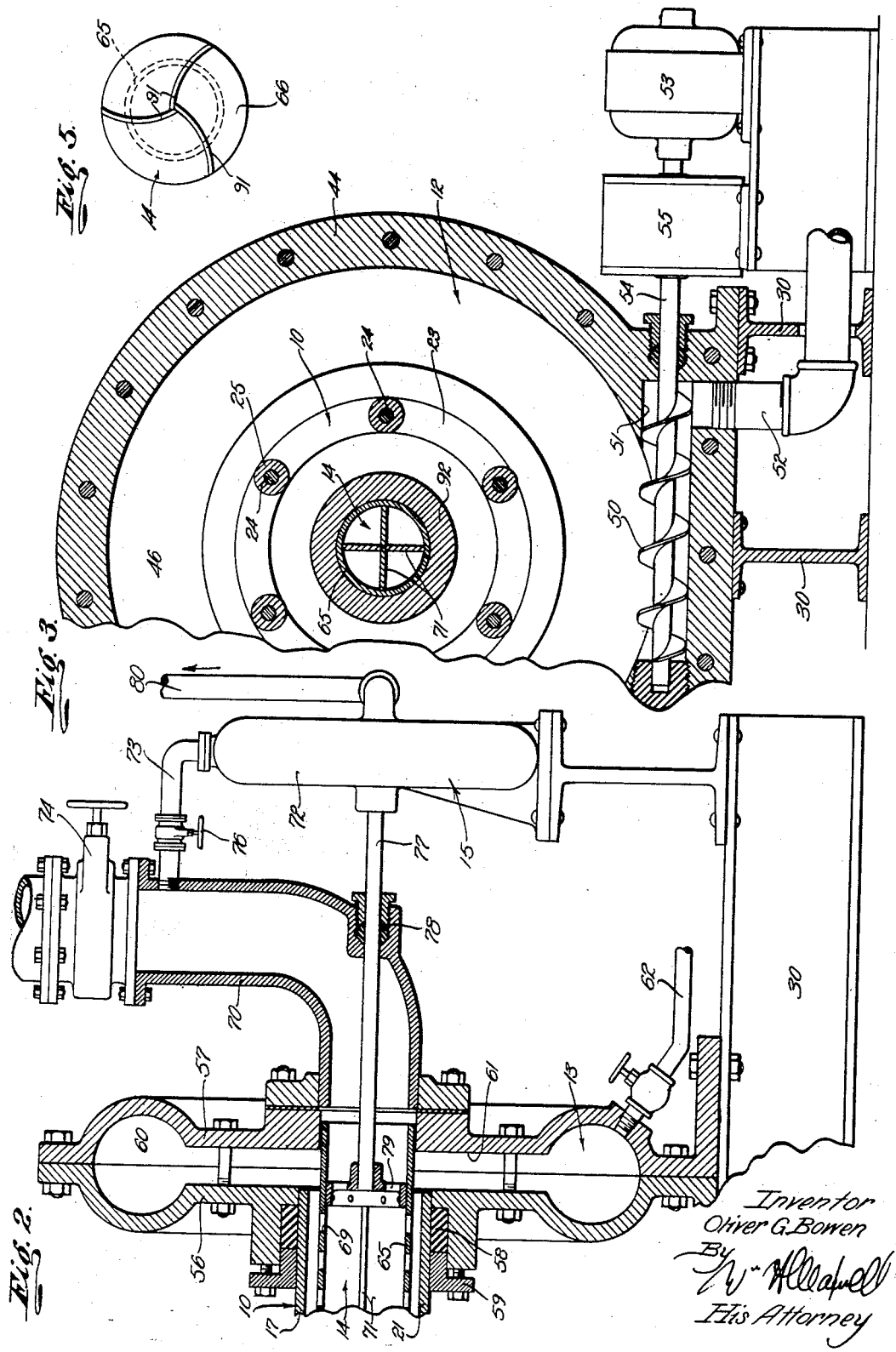

July 11, 1933.  O. G. BOWEN  1,917,792
METHOD AND APPARATUS FOR SEPARATING FLUIDS
Filed July 27, 1932  3 Sheets-Sheet 3

Inventor
Oliver G. Bowen
By W. H. Clapnell
His Attorney

Patented July 11, 1933

1,917,792

UNITED STATES PATENT OFFICE

OLIVER G. BOWEN, OF PASADENA, CALIFORNIA, ASSIGNOR TO ARTHUR W. LEWIS, OF PASADENA, CALIFORNIA

METHOD AND APPARATUS FOR SEPARATING FLUIDS

Application filed July 27, 1932. Serial No. 625,146.

This invention relates to a method and apparatus for separating fluids, and relates more particularly to a method and apparatus for separating gas, water, mud, solid matter, etc., from oil. A general object of the present invention is to provide an economical and commercially practical method and a simple and effective apparatus for separating fluids.

The method and apparatus provided by the present invention, while not limited to any particular use or application, is adapted to separate gas, water, sand and other solid matter, etc., from crude petroleum as it is produced or flows from the well. Various types of apparatus have been introduced for separating the gas, water, mud, etc., from crude oil as it flows or is produced from the well. These apparatuses commonly termed "separators" are usually in the nature of pressure settling tanks, in which the crude oil is introduced into a closed chamber or tank, and caused to flow over baffle surfaces in comparatively thin films to permit the escape of gas, and is then caught in the bottom of the tank where it is allowed to settle so that the oil, water and solid matter may separate and stratify through the action of gravity whereby the oil may be readily removed or separated from the other liquid constituents and the settlings. The operation of apparatus of the character just referred to is often governed by automatic float valves, etc., which give considerable trouble. Further, separators or apparatus of the type referred to are necessarily very large and therefore expensive, and are slow and intermittent in their operation.

An object of the present invention is to provide an economical and commercially practical method and apparatus for separating fluids, for example, for separating the gas, water, sand, mud, etc., from crude oil that are rapid and continuous in their operation. By the term "fluids", I mean liquids, gases, and finely divided solids held or carried by liquids and/or gases so as to flow through the device as fluids.

It is another object of the invention to provide a method for separating fluids in which the fluids are quickly and effectively separated through a centrifugal action.

It is another object of the invention to provide an apparatus for separating fluids that is compact and comparatively small in size and inexpensive of manufacture and operation.

It is another object of the invention to provide a centrifugal separator that is rapid and continuous in its operation. In accordance with the present invention, a continuous supply of an emulsion of mixed fluids as produced from a well, may be passed into the separator and the action of the apparatus or separator is continuous to provide for a continuous production or discharge of oil and gas.

It is another object of the invention to provide an apparatus of the character mentioned that includes a rotating tubular body into which the fluid is initially passed and in which the water, sand, mud and other heavy elements or constituents are separated from the oil through a centrifugal action and then trapped and drawn off, the oil being permitted to pass through the rotating body and is then trapped and drained off.

It is another object of the invention to provide an apparatus of the character mentioned in which the separated gas under pressure is employed to drive or rotate the body.

It is another object of the invention to provide apparatus of the character mentioned that includes a novel and effective means for causing an initial rotary movement of the fluid as it enters the rotating body.

A further object of the invention is to provide an apparatus of the character mentioned that embodies a particularly effective means for scrubbing the gas as it passes through the rotating tubular body.

Other objects and features of the invention will be best and more fully understood from the following detailed description of typical forms and applications of the invention, throughout which description reference is had to the accompanying drawings in which:

Fig. 1 is a vertical detailed sectional view of the forward or principal portion of the apparatus. Fig. 2 is a vertical detailed sectional view of the rear or remaining portion of the apparatus. Fig. 3 is a fragmentary transverse detailed sectional view taken as indicated by line 3—3 on Fig. 1. Fig. 4 is a transverse detailed sectional view taken as indicated by line 4—4 on Fig. 1. Fig. 5 is a front elevation of the baffle being a view taken as indicated by line 5—5 on Fig. 1, and Fig. 6 is a longitudinal detailed sectional view of another form of the invention.

It is believed that the method provided by the invention will be readily understood from a description of the construction and operation of the apparatus and I will therefore proceed with a detailed description of two typical forms of the apparatus and their mode of operation. The device or apparatus provided by the invention is adapted to be embodied in forms for handling various classes of fluids and may be provided in types for use in various situations and under various conditions. In the following detailed disclosure I will describe typical embodiments of the invention adapted for separating the gas, water, sand, etc., from crude oil, it being understood that the invention is not to be taken as limited or restricted to the specific forms or application about to be described, but is to be taken as including any features or modifications that may fall within the scope of the claims.

The apparatus illustrated in Figs. 1 to 5 inclusive of the drawings includes, generally, a rotatable tubular body 10 adapted to receive the crude oil to be handled, means 11 for causing rotation of the fluid as it passes into the body 10, means 12 for trapping and drawing off the solid matter and heavier liquids, means 13 for trapping and draining off the oil, means 14 for scrubbing the gas as it passes through the body 10, and means 15 for rotating the body 10.

The tubular body 10 is continuously rotated during the operation of the apparatus and is preferably, though not necessarily, horizontally disposed as illustrated in Fig. 1 of the drawings. In accordance with the broader aspects of the invention, the construction of the body 10 may be varied considerably. In the particular embodiment of the invention illustrated in the drawings, the body 10 is sectional, comprising sections 16 and 17. The body section 16 which I will term the forward or outer section is provided to initially receive the crude petroleum and carries the means 11 for causing the rotation of the petroleum. The section 16 is an integral tubular member having a cylindrical outer portion 18, and an enlarged or flared inner portion 19. A cylindrical enlargement or annular flange 20 is provided at the end of the flared portion 19.

The inner section 17 of the body 10 is an integral tubular member consisting of a cylindrical main or inner portion 21 and a flared portion 22 opposing and connecting with the flared portion 19 of the section 18. The flared portion 22 of the section 21 is complementary to the flared portion 19, that is, it is of substantially the same size and configuration as the portion 19, and has a cylindrical flange 23 at its end. Suitable bolts 24 extend through openings in the flanges 20 and 23 to connect the body sections 16 and 17. Spacers 25 are provided on the bolts 24 between adjoining ends of the body sections 16 and 17 to provide a substantially continuous annular opening or channel in the wall of the body 10 at the enlargement formed by the two enlarged or flaring portions 19 and 22.

The body 10 constructed as described above, has a central longitudinal opening extending through it from one end to the other, which opening has two end portions 26 and 27 in the body portions 16 and 17 respectively and an enlargement or chamber 28 in the flared body portions 19 and 22. The chamber 28 corresponds generally to the configuration of the opposing and connected portions 19 and 22, its walls converging outwardly to the channel 29. The opening enlargement or chamber 28 constitutes what may be termed an expansion chamber that receives the fluids after they have been caused to rotate by the means 11.

The invention provides a practical and effective means for rotatably supporting the body 10, it being obvious that the body 10 may be supported for rotation in manners varying somewhat in design and construction. In the form of the invention illustrated in the drawings, the means for supporting the body 10 for rotation about a horizontal axis includes horizontally spaced supporting beams 30. A transverse beam 31 extends between and is mounted on the spaced supports 30. An anti-friction bearing 32 surrounds the portion 21 of the body section 17 and is carried by a suitable mounting or bracket 33 carried on the upper end of the beam 31. A frame structure 34 is mounted on the forward end portions of the beams 30. An anti-friction bearing 35 surrounds and carries the forward end portion 16 of the body and is carried in a bracket 36 supported by the frame structure 34. The bearings 32 and 35 are substantially equally spaced from the opposite ends of the body 10, and the body 10 is well balanced so that it requires a minimum amount of power to rotate it.

The invention includes means for connecting the delivery or supply conduit 37 with the forward end of the rotating body 10 so as to discharge the crude petroleum into the body. The conduit 37 may be considered as delivering the crude petroleum under pressure from the well or other source. A suitable connecting sleeve or nipple 38 is attached to the end of the conduit 37 by a flange and bolt connection 39. The nipple 38 is co-axial with the body 10 and has a socket in its end which receives the forward portion 18 of the body section 16. Packing 40 is provided to seal between the body portion 18 and the nipple 38 and a gland 41 is provided to compress and retain the packing.

The means 11 is provided to cause rotation of the fluid as it enters the opening 26 and passes into the chamber 28 and acts to cause the fluid to rotate with the body so that the several constituents or elements of the crude petroleum are separated and stratified in the chamber 28 by centrifugal force. The means 11 includes a plurality of blades or vanes 42 in the opening 26. The blades or vanes are pitched or spiralled and are secured to the walls of the opening 26. In accordance with the invention, the pitch of the vanes 42 increases from the forward end of the body inwardly so that the fluid is caused to rotate at a higher velocity as it progresses or passes through the opening 26. The fluid or crude petroleum passes directly from the means 11 into the chamber 28 where the initial separating act or step takes place in which the various constituents or fluids of the crude petroleum separate and stratify into annular or cylindrical strata, through the action of centrifugal force. It will be apparent that as the fluid rotates with the body, the solid matter and heavier liquids such as water and mud tend to form an outer tubular stratum against the walls of the body chamber 28, while the lighter fluids or oils form an inner tubular or cylindrical stratum, freeing the gas which occupies the center of the body opening. As the walls of the chamber 28 converge toward the channel of opening 29, the outer stratum of heavy elements passes out through the opening 29 and is received by the means 12.

The means 12 for trapping and drawing off the water, mud, solid, matter, etc., operates to trap the heavier constituents of the crude petroleum, such as water, mud, sand, etc., of the outer tubular layer or stratum passing from the chamber 28 through the annular opening, and continuously withdraw them or carry them off from the body opening. The means 12 includes an annular trap surrounding the body 10 which receives the mud, sand, water, etc., passing or thrown outwardly through the channel or opening 29 in the wall of the chamber 28. In the particular form of the invention being described, the mud, sand and water trap includes two substantially like or complementary annular sections 43 and 44 surrounding the body 10 at the flanges 20 and 23. The trap sections 43 and 44 are supported on the base beams 30 and are connected together by suitable bolts 45. Registering annular grooves are provided in the abutting or opposing sides of the sections 43 and 44 to form an annular opening 46. The opening 46 may be substantially round in cross section as illustrated in the drawings. The trap sections 43 and 44 are spaced apart at the inner wall of the opening 46 to provide an annular passage 47 that connects the channel or opening 29 with the trap opening 46. Packing 48 is provided to seal between the flanges 20 and 23 and the trap sections 43 and 44. Annular compression glands 49 are provided to compress and retain the packing 48. The heavier elements or constituents of the petroleum separate from the oil and are thrown to the outer portion of the chamber 28 because of their greater specific gravity and pass through the channel 29 and passage 47 to be trapped in the opening 46 in the stationary trap. The trap opening 46 communicates or is connected with the largest part of the flared chamber 28, and the chamber is shaped so as to insure the passage of all of the water, sand, mud, etc., into the trap opening.

Means is provided for continuously removing the water, mud, sand, etc., from the trap opening 46. A valve controlled conduit 90 connects with the trap opening 46 to drain the liquids from the trap. A screw 50 operates in an opening 51 communicating with the lower end of the trap opening 46. The rotating screw 50 draws the mud, sand and like material from the trap opening 46 and discharges it into a suitable outlet or conduit 52. The screw 50 may be rotated in any suitable manner, for example, it may be operated by an electric motor 53 rotating the shaft 54 of the screw through a suitable reduction gear 55. The conduit 90 and the screw 50 are preferably of sufficient capacity to maintain the innermost wall or level of the annular stratum of heavier constituents well within the trap opening 46. The extent of the stratum of water, mud, sand, etc., of course depends upon the character of the crude petroleum being handled, the speed of rotation of the body 10, and other factors, but it is preferred to relate these various factors so that this stratum of heavy elements or fluids is entirely contained or trapped within the trap opening 46. The separation of the water, mud, sand, etc., from the oil is continuous during operation of the apparatus and the cleaned oil accumulates in the chamber 28 and flows rearwardly into the body opening 27. Due to the centrifugal force exerted on the oil, this rearwardly passing oil is in the nature of a layer or comparatively heavy film on the wall of the opening 27.

The means 13 for trapping or removing the oil from the body 10 is disposed at the rear end of the body and includes a trap comprising annular sections 56 and 57 mounted on the supporting beams 30. The section 56 surrounds the innermost or rear end of the body portion 21 and packing 58 is provided to seal between the section 56 and the body portion. The packing 58 is maintained under compression by annular gland 59 surrounding the body portion 21 and adjustably secured to the trap section 56. Opposing and registering grooves are provided in the inner sides of the trap sections 56 and 57 to form an annular trap opening 60. The sections 56 and 57 are spaced apart at their inner portions to provide a passage 61 which connects the rear end of the body opening 27 with the trap opening 60. The oil, upon leaving the end of the body, passes outwardly through the passage 61 into the opening 60. A suitable valve controlled conduit or pipe 62 is provided to drain the oil from the lower portion of the opening 60. A continuous stream or film of oil passes from the inner or rear end of the body opening 27 and is caught in the trap opening 60 to flow outwardly through the pipe 62.

The means 14 for scrubbing the gas acts to remove the greater proportion of the lighter liquids or oils from the gas as it passes through the body 10. The means 14 includes a tube 65 within the body 10 for receiving the gas which gathers in the center of the body opening. The tube 65 extends through the body opening 27, having its forward end within the forward portion of the chamber 28 and having its rear end within the trap section 57. In the preferred construction, the tube 65 is co-axial with the axis of rotation of the body 10 and is spaced from the walls of the body opening 27. A baffle 66 closes the forward end of the tube 65. The baffle 66 may be flat and disc-shaped and may project from the periphery of the tube 65. The baffle 66 acts to deflect outwardly any liquids or solids that may impinge against its forward side and acts to prevent liquids or solids from entering the forward end of the tube 65. The baffle 66 is thus effective in diverting outwardly any liquids that may pass inwardly through the center of the chamber 28.

The preferred form of the invention includes centrifugal vanes 91 on the forward side of the baffle 66 for throwing the fluids outwardly. The vanes 91 provide for a more complete separation of the fluids through the centrifugal action. A plurality of longitudinally spaced fins 92 surround the forward end portion of the tube 65. The fins 92 operate to prevent excessive agitation or turbulence of the fluids in the chamber 28. The fins 92 are particularly effective in giving the rearwardly passing gas a preliminary scrubbing and in materially reducing the pressures on the rearwardly flowing fluids. The fins accomplish this preliminary scrubbing by causing small vortices or swirling movements, termed vorticellas, to be set up in the fluid as it flows along the tube. By proper attention to the spacing of these fins a high degree of separation of the gaseous content from the liquid is obtained and the fins thus constitute a highly important feature of the apparatus.

In accordance with the invention, the tube 65 is connected with the body 10 to rotate therewith. Screws or bolts 67 may be provided to attach the tube 65 to the inner body section 17. Suitable spacers 68 may be provided on the screws or bolts 67 to space the tube 65 from the walls of the opening 27. The tube 65 is spaced a sufficient distance from the wall of the opening 27 to pass the layer or stratum of oil on the wall of the opening with substantial clearance. Spaced perforations or openings 69 are provided in the tube 65 to admit the gas into the tube. The gas, after its admittance to the tube 65, flows rearwardly through the tube to discharge into a pipe or conduit 70.

A plurality of baffles 71 is provided in the tube 65 to scrub the gas or remove liquids from the gas. The baffles 71 may be varied considerably in character. In the particular case illustrated in the drawings there are two crossed baffles 71 extending longitudinally through the tube 65. The baffles 71 may extend diametrically across or through the tube 65 to divide its interior into four longitudinal passages. The baffles 71 are attached to the tube 65 and accordingly rotate with the tube. The rotating baffles 71 collect the liquids from the gas as it flows through the tube 65 and the liquids pass out through the openings 69 through centrifugal action and join or mix with the layer of oil on the wall of the body opening 27. The gas receiving tube 65 with its scrubbing baffles 71 operates to receive the gas flowing through the body 10 and to effectively remove or separate the lighter liquids from the gas.

The means 15 for rotating the body 10 may be in the nature of any suitable form of power means; however, the present invention provides a means 15 for rotating the body 10 that is driven or actuated by the gas under pressure after its passage through the tube 65. The body rotating means 15 includes a turbine 72 operated by gas under pressure supplied to it by a pipe 73 connected with the conduit 70. A suitable valve 74 is provided in the conduit 70 above the pipe 73 to control or govern the pressure within the body 10 and the pressure on the gas supplied to the turbine 72. A control valve 76 is provided in the pipe 73 to govern the admission of the gas to the turbine 72. The driven shaft 77 of the turbine 82 passes through a packing gland 78 in the wall of the conduit 70 and extends into a rear end of the gas receiving tube 65. A spider 79 operatively connects the forward end of the turbine shaft 77 with the tube 65. As the body 10 and tube 65 are rigidly connected together by means of the bolts or screws 67, they are rotated together by the turbine 72. The gas after its passage through the turbine 72 may be returned to the conduit 70 at a point beyond the valve 75 by a return pipe 80.

It is believed that the operation of the apparatus illustrated in Figs. 1 to 5 of the drawings will be readily understood from the foregoing detailed description. The crude petroleum, either in the form of an emulsion or a mixture, is admitted under a suitable pressure to the body opening 26 through the conduit 37. As the body 10 is continuously rotated by means of the turbine 72, the vanes 42 act upon the inflowing crude petroleum to cause it to rotate with the body and to be thrown or forced outwardly toward the walls of the chamber 28. The constituents of the crude petroleum separate in accordance with their specific gravities as the centrifugal force acting upon the rotating fluid causes the heavier elements to be thrown outwardly at a higher velocity and to form an outer layer or stratum in the chamber and the lighter liquids to form an inner layer or stratum in the chamber which surrounds the freed gas.

Where the apparatus is employed to handle crude petroleum, the sand and other solid matter, water and mud, they being the heavier elements or constituents, form the outermost stratum or layer which passes through the channel 29 and the passage 47 into the trap opening 46. The oil, being the lighter liquid constituent, forms the inner stratum or layer which occupies the outer portions of the chamber 28 and which may occupy the channel 29 and the passage 47. It will be obvious that the separation of the liquid elements in the manner just described permits the freeing of the gas, which, being of low specific gravity, collects in the axial or central portion of the chamber 28. As the fluid flows rearwardly through the body opening and continuously rotates, the stratum of oil continuously advances through the body opening 27 as a layer or stratum laying against the wall of the opening 27. The rearwardly flowing gas passes around the periphery of the baffle 66 and successively over the several fins 92 and enters the openings 69 in the tube 65. In this manner the rearwardly flowing oil passes from the rear end of the body 10 to be caught in the trap opening 60 and drained from the pipe 62, while the gas flows rearwardly through the tube 65 into the discharge conduit 70. The baffles 71 within the rotating tube 65 effectively scrub the fluid and remove the liquid from the gas, which liquid is flung outwardly centrifugally to mix with the layer of oil flowing rearwardly against the walls of the body opening 27. The gas under pressure passes outwardly through the conduit 70, and a portion of it flows through the pipe 73 to actuate the turbine 72.

It will be obvious how the pressures within the body 10 and the speed of operation of the rotor 70 may be governed and related to provide for the proper effective operation of the apparatus. It is to be noted that the present invention provides an apparatus for separating fluids that is effective and economical in its operation, in that it insures the proper and complete separation of the several fluids or elements. Further, the apparatus includes the scrubbing means 14 which provides for the further effective scrubbing and drying of the gas to provide a dryer gas and a higher quality of oil. The apparatus is rapid and continuous in its operation and does not depend upon the operation of automatic float valves, or the like. Due to its rapid operation and its peculiar construction and principle of operation, the apparatus may be embodied in a comparatively small and compact structure.

Fig. 6 of the drawings illustrates the principal portions of another embodiment of the invention involving a modified form or type of gas scrubbing means 14$^a$. The body 10$^a$; the fluid rotating means 11$^a$; the water, mud and solid matter trap means 12$^a$; the oil trapping means 13$^a$; and the body rotating means 15$^a$ of this form of the invention may be similar to or identical with the corresponding elements of the form of the invention illustrated in Figs. 1 to 5 inclusive of the drawings. The modified form of gas scrubbing means 14$^a$, included in the form of the invention illustrated in Fig. 6 of the drawings, operates to partially scrub or clean the gas prior to its passage into the gas receiving tube, and further operates to materially lessen the pressure on the gas as it flows rearwardly through the body.

The gas scrubbing means 14$^a$ illustrated in Fig. 6 of the drawings includes a tube 65$^a$ extending through the tubular body 10$^a$. The tube 65$^a$ extends centrally through the opening 27$^a$ in the rear portion of the body 10$^a$ and has its forward end in or adjacent the body chamber 28$^a$ and its rear end disposed adjacent the rear end of the body 10$^a$. In accordance with this form of the invention, the gas receiving tube 65$^a$ is longitudinally tapered, being of increasingly large diameter from its forward end toward its rear end. If desired or found practical, the tube 65$^a$ may be longitudinally tapered throughout its length. It is to be understood that the tube 65$^a$ is concentrically arranged within the body opening 27$^a$ and has its exterior spaced from the wall of the body opening 27$^a$ to provide for the passage of the layer or film of oil passing rearwardly through the opening. The gas receiving tube 65$^a$ is connected to the body 10$^a$ and centered in the opening 27ª by suitable bolts or screws 95 carrying washers or spacers 96. The body 10ª together with the tube 65ª may be rotated by any suitable means, for example, by a gas driven turbine of the character described above through a shaft 97 extending into the gas receiving conduit 98 and attached to the tube 65ª. The gas receiving tube 65ª is open at its rear end to discharge into the conduit 98. The forward end of the tube 65ª which is located adjacent or within the chamber 28ª is closed by a plate 99. Gas scrubbing baffles 100 are provided within the tube 65ª. The baffles 100 may be similar to the baffles 71 described above. These baffles act like those previously described and establish vorticellas along the tube in spaced relation to its axis, the axes of the vorticellas thus established being substantially at right angles to the flow of fluid along the axis of the tube.

The means 14ª includes a multiplicity of fins or baffles 101 on the exterior of the gas receiving tube 65ª for scrubbing the gas prior to its admission to the tube and for reducing the pressure on the gas. In accordance with the form of the invention being described, an extension 102 is provided on the forward end of the tube 65ª. The extension 102 may be attached to the tube 65ª through the plate 99 and may be either solid or in the form of an imperforate tube. The tube extension 102 extends forward through the chamber 28ª and is provided at its forward end with a baffle 104 similar generally in structure and operation to the baffle 66 previously described. If desired or found practical, suitable centrifugal blades 105 may be provided on the forward face of the baffle 104. In the event the tube extension 102 is tubular, the baffle 104 may operate to close its forward end. The fins or baffles 101 mentioned above are spaced longitudinally of the tube 65ª and the tube extension 102. The baffles 101 are preferably in the nature of annular plates surrounding the tube 65ª and its extension. In accordance with the invention, the baffles 101 are proportioned so as to cause the central stratum or core of gas to successively pass or advance over them during its rearward passage through the body 10ª. In the particular case illustrated, the baffles 101 are of the same or equal external diameter. In accordance with the embodiment of the invention being described, the spacing of the several baffles 101 is varied. The spaces between the baffles 101 are increasingly smaller from the forward end of the series toward the rear end of the series. This relationship of the several baffles 101 is clearly illustrated in Fig. 6 of the drawings.

As the tube extension 102 is imperforate, the gas must pass over each of the several baffles 101 on the tube extension and then pass over the plate 99, which may in fact, constitute one of the baffles 101, before it reaches any of the openings 107 in the tube 65ª. The openings 107 in the walls of the tube 65ª are suitably spaced between the spaced baffles 101. In practice, the baffles 101 operate to effectively wash or scrub the gas as its passes rearwardly so that by the time it passes into the tube 65ª it is comparatively clean and dry. It will be obvious that the lighter liquids removed from the gas by the baffles 101 are automatically thrown outwardly centrifugally to mix with the film of oil flowing rearwardly over the walls of the body opening 27ª. As the gas is caused to pass over the several baffles 101 on the tube extension 102 and to pass over certain of the baffles 101 on the tube 65ª before it is admitted into the tube, its pressure is materially reduced, and excessive variations or surges in pressure are eliminated. The baffles 101 also act to eliminate undesirable turbulence or agitation in the chamber 28ª. It is to be noted that the flared or tapered gas receiving tube 65ª also provides for a reduction in the pressure on the gas as it flows rearwardly to be received by the conduit 98. In other respects than those pointed out above the operation of the embodiment of the invention illustrated in Fig. 6 of the drawings is similar to or identical with the operation of the previously described form.

It is believed that the method provided by the present invention will be apparent from the foregoing detailed description of the construction and mode of operation of the apparatus. The method provided by the present invention for the separation of fluids includes generally, passing an emulsion or mixture into a rotating tube so as to cause the emulsion or mixture to rotate whereby its various constituents separate into individual strata or zones, drawing off the outermost stratum of the fluids which in practice constitute the heaviest elements, scrubbing the gas within the rotating tube by means of rotating parts to remove the lighter liquids from the gas, and the drawing off of the lighter liquids. The steps or acts of the method outlined above are continuous and are substantially uniform in their results as regards any particular volume of fluid handled. The lighter liquids scrubbed or removed from the gas join and mix with the stratum of lighter liquids, and are drawn off with it. In the embodiment of the invention illustrated in Figs. 1 to 5 of the drawings this separation or removal of the lighter liquids from the gas is attained principally within the gas receiving tube 65 while in the embodiment disclosed in Fig. 6 the lighter liquids are scrubbed or removed from the gas by the baffles on the exterior of the gas receiving tube 65ª and to some extent by the baffles within the tube. The method is particularly economical and advantageous, as it insures an effective separation of the various liquids of a mixture or an emulsion, and thus insures products of uniform quality or character. Since an emulsion is a specific type of mixture the word "mixture" as used in the appended claims is to be understood as including emulsion also.

Having described only a typical preferred form of my invention, I do not wish to limit myself to the specific details set forth, but wish to reserve to myself all changes and variations that may appear to those skilled in the art or fall within the scope of the following claims.

Having described my invention, I claim:

1. Apparatus for separating the gas and oil from crude petroleum including a rotatable tubular body, means for rotating the body, means for passing the petroleum under pressure into one end of the body, vanes in the body for acting on the petroleum to cause it to rotate with the body, there being a chamber in the body spaced between the ends of the body, and an opening in the wall of the body communicating with the chamber, a trap for receiving the water, solid matter etc., thrown outwardly to said opening by centrifugal force, a tube in the body for receiving the gas and for discharging it from the other end of the body and a trap at said other end of the body for receiving the oil.

2. Apparatus for separting the component elements of a mixture having a gaseous constituent which apparatus includes a rotatable tubular body, means for rotating the body, means for introducing the mixture into the forward end of the body to rotate therewith whereby its constituents are separated centrifugally, a longitudinally tapered gas receiving tube arranged longitudinally in the body, the tube having longitudinally spaced openings to admit gas into the tube from the body and having an outlet, longitudinally spaced baffles on the exterior of the tube, and means for claiming liquid from the body.

3. Apparatus for separating the component elements of a mixture having a gaseous constituent which apparatus includes a rotatable tubular body, means for rotating the body, means for introducing the mixture into the forward end of the body to rotate therewith whereby its constituents are separated centrifugally, a longitudinally tapered gas receiving tube arranged longitudinally in the body, the tube having longitudinally spaced openings to admit gas into the tube from the body and having an outlet, longitudinally spaced baffles on the exterior of the tube, the spacings of the baffles being varied, and means for draining liquid from the body.

4. The method of separating the constituent portions of a mixture, said method including rotating the mixture while maintaining it in a predetermined form whereby it is concentrically stratified, permitting the heavier outer strata to flow off externally, causing the inner strata to flow longitudinally in a stream, causing the establishment of vorticellas along said stream whereby the lighter and heavier constituents of said stream are scrubbed and separate and collect respectively at the center and the peripheral portion of the stream, and drawing off said lighter and heavier constituents separately.

5. The method of separating the constituent portions of a mixture, said method including rotating the mixture while maintaining it in a predetermined form whereby it is concentrically stratified, permitting the heavier outer strata to flow off externally, causing the inner strata to flow longitudinally in a stream while maintaining the rotation of said stream about its longitudinal axis, causing the establishment of successive vorticellas in said stream with their axes of rotation at right angles to the direction of flow of the stream whereby to effect scrubbing of said inner strata to separate the lighter and heavier constituents in inner and outer strata respectively, and permitting the separated lighter and heavier constituents of said inner stream to pass separately from stream.

6. The method of separating the constituent portions of a mixture containing liquid and gas, said method including rotating the mixture while maintaining it in a predetermined form whereby it is concentrically stratified, permitting the heavier outer strata to flow off externally, causing the inner strata containing the gas to flow longitudinally in a stream while maintaining the rotation of the stream about its longitudinal axis, causing the establishment of vorticellas along said stream in spaced relation to its axis, said vorticellas having their axes of rotation at right angles to the direction of flow of the stream along its axis, said vorticellas effecting scrubbing of the mixture in the stream and thereby separating it into gaseous and liquid strata with the gaseous portion forming the center of the stream, and permitting the gaseous and liquid portions of the stream to flow off separately.

7. The method of separating the constituent portions of a mixture containing liquid and gas, said method including rotating the mixture while maintaining it in a predetermined form whereby it is concentrically stratified, permitting the heavier outer strata to flow off externally, causing the inner strata containing the gas to flow longitudinally in a stream while maintaining the rotation of the stream about its longitudinal axis, causing the establishment of vorticellas along said stream in spaced relation to its axis, said vorticellas having their axes of rotation at right angles to the direction of flow of the stream along its axis, said vorticellas effecting scrubbing of the mixture in the stream and thereby separating it into gaseous and liquid strata with the gaseous portion forming the center of the stream, subjecting the gaseous portion of the stream to a further scrubbing to remove liquid therefrom and adding the removed liquid to the main body of liquid in the stream whereby to dry the gas, and permitting the gaseous and liquid portions of the stream to flow off separately.

8. The method of separating the constituent portions of a mixture containing liquid and gas, said method including rotating the mixture while maintaining it in a predetermined form whereby it is concentrically stratified, permitting the heavier outer strata to flow off externally, causing the inner strata containing the gas to flow longitudinally in a stream while maintaining the rotation of the stream about its longitudinal axis, causing the establishment of vorticellas along said stream in spaced relation to its axis, said vorticellas having their axes of rotation at right angles to the direction of flow of the stream along its axis, said vorticellas effecting scrubbing of the mixture in the stream and thereby separating it into gaseous and liquid strata with the gaseous portion forming the center of the stream, subjecting the gaseous portion of the stream to a further scrubbing to remove liquid therefrom and adding the removed liquid to the main body of liquid in the stream whereby to dry the gas, said gaseous portion of the stream being permitted to expand transversely of its flow during said further scrubbing, and permitting the gaseous and liquid portions of the stream to flow off separately.

9. Apparatus for separating the component portions of a mixture having a gaseous component, said apparatus including a tubular body, means for passing the mixture into the body, means for causing rotation of the mixture as a whole while in the body whereby the components of the mixture separate through centrifugal action, means for withdrawing gas from the tubular body along the axis of the rotating mixture, and means associated with the last mentioned means for causing the establishment of eddy currents constituting vorticellas in said mixture adjacent its axis.

10. Apparatus for separating the component portions of a mixture having a gaseous component, said apparatus including a tubular body, means for passing the mixture into the body, means for causing rotation of the mixture as a whole while in the body whereby the components of the mixture separate through centrifugal action, means for withdrawing gas from the tubular body along the axis of the rotating mixture, means associated with the last mentioned means for causing the establishment of eddy currents constituting vorticellas in said mixture adjacent its axis, and means for effecting drying of the gas during its withdrawal.

11. Apparatus for separating the component portions of a mixture having a gaseous component, said apparatus including a tubular body, means for passing the mixture through the body, means for causing rotation of the mixture as a whole while in said body, whereby the components of the mixture separate under centrifugal action and the gas tends to collect at the axis of rotation of the mixture, a perforated gas tube extending coaxially with the axis of rotation of the mixture to receive gas from the mixture and conduct it away from the body, and spaced fins on the exterior of said tube arranged to cause eddy currents and the formation of vorticellas in the mixture at the exterior of the tube.

12. Apparatus for separating the component portions of a mixture having a gaseous component, said apparatus including a tubular body, means for passing the mixture through the body, means for causing rotation of the mixture as a whole while in said body, whereby the components of the mixture separate under centrifugal action and the gas tends to collect at the axis of rotation of the mixture, a perforated gas tube extending coaxially with the axis of rotation of the mixture to receive gas from the mixture and conduct it away from the body, spaced fins on the exterior of said tube arranged to cause eddy currents and the formation of vorticellas in the mixture at the exterior of the tube, and scrubbing baffles within the perforated gas tube arranged to cause drying of the gas flowing through said gas tube.

13. Apparatus for separating the component portions of a mixture having a gaseous component, said apparatus including a tubular body, means for passing the mixture through the body, means for causing rotation of the mixture as a whole while in said body, whereby the components of the mixture separate under centrifugal action and the gas tends to collect at the axis of rotation of the mixture, a perforated gas tube extending coaxially with the axis of rotation of the mixture to receive gas from the mixture and conduct it away from the body, spaced fins on the exterior of said tube arranged to cause eddy currents and the formation of vorticellas in the mixture at the exterior of the tube, a liquid outlet tube extending from said body and having the gas tube extending axially therethrough to provide a liquid passage between the gas tube and fluid outlet tube, means to receive liquid flowing from the liquid outlet tube, and means at the periphery of the body to permit escape of the heavier components of the mixture and to collect the same.

14. Apparatus for separating the component portions of a mixture having a gaseous component, said apparatus including a tubular body, means for passing the mixture through the body, means for causing rotation of the mixture as a whole while in said body, whereby the components of the mixture separate under centrifugal action and the gas tends to collect at the axis of rotation of the mixture, a perforated gas tube extending coaxially with the axis of rotation of the mixture to receive gas from the mixture and conduct it away from the body, spaced fins on the exterior of said tube arranged to cause eddy currents and the formation of vorticellas in the mixture at the exterior of the tube, scrubbing baffles within the perforated gas tube arranged to cause drying of the gas flowing through said gas tube, a liquid outlet tube extending from said body and having the gas tube extending axially therethrough to provide a liquid passage between the gas tube and fluid outlet tube, means to receive liquid flowing from the liquid outlet tube, and means at the periphery of the body to permit escape of the heavier components of the mixture and to collect the same.

In witness that I claim the foregoing I have hereunto subscribed my name July 1932.

OLIVER G. BOWEN.